(12) United States Patent
Tagami

(10) Patent No.: US 10,921,978 B2
(45) Date of Patent: Feb. 16, 2021

(54) SHAFT FEEDER

(71) Applicant: FANUC CORPORATION, Yamanashi (JP)

(72) Inventor: Kouta Tagami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 50 days.

(21) Appl. No.: 16/363,222

(22) Filed: Mar. 25, 2019

(65) Prior Publication Data
US 2019/0317652 A1 Oct. 17, 2019

(30) Foreign Application Priority Data

Apr. 16, 2018 (JP) .............................. JP2018-0078281

(51) Int. Cl.
G05B 15/02 (2006.01)
G06F 3/0488 (2013.01)

(52) U.S. Cl.
CPC ............ *G06F 3/0488* (2013.01); *G05B 15/02* (2013.01)

(58) Field of Classification Search
CPC ............... G06F 3/0488; G06F 3/04847; G06F 3/04883; G06F 3/03547; G05B 15/02; G05B 19/427; G05B 19/045
See application file for complete search history.

(56) References Cited

U.S. PATENT DOCUMENTS

| 2014/0108984 | A1* | 4/2014 | Kunori | G06F 3/04847 715/771 |
| 2014/0172148 | A1* | 6/2014 | Miller | G05B 19/409 700/183 |
| 2016/0253082 | A1* | 9/2016 | Sakamoto | G05B 19/195 715/719 |
| 2016/0259319 | A1* | 9/2016 | Haga | G05B 19/401 |

FOREIGN PATENT DOCUMENTS

| CN | 103914257 | 7/2014 |
| JP | 11-3109 | 1/1999 |
| JP | 11-338600 | 12/1999 |

(Continued)

OTHER PUBLICATIONS

Notification of Reasons for Refusal dated Mar. 10, 2020 in Japanese Patent Application No. 2018-078281.

(Continued)

*Primary Examiner* — Christopher E. Everett
(74) *Attorney, Agent, or Firm* — Wenderoth, Lind & Ponack, L.L.P.

(57) ABSTRACT

To provide a shaft feeder with which an operation for setting a shaft movement amount can be performed on a touch panel and numerical values for the shaft movement amount can be accurately set. A shaft feeder is used for moving a shaft in an industrial device and includes a display device including a touch panel, an operation detector that detects a left/right swipe operation on the touch panel, a display control unit that displays coordinate values relating to the shaft on the display device and changes the displayed coordinate values (Continued)

(OPERATION)

1234.567

(DISPLAY AFTER OPERATION)

1234.000 on the basis of the swipe operation detected by the operation detector, and a shaft movement unit that moves the shaft to a position indicated by the coordinate values on the basis of the displayed coordinate values.

11 Claims, 10 Drawing Sheets

(56) References Cited

FOREIGN PATENT DOCUMENTS

| JP | 2000-305614 | 11/2000 |
| JP | 2013-164769 | 8/2013 |
| JP | 2014-81789 | 5/2014 |
| JP | 2017-84384 | 5/2017 |
| JP | 2017-111516 | 6/2017 |
| JP | 2018-13981 | 1/2018 |

OTHER PUBLICATIONS

Office Action dated Nov. 3, 2020 in Chinese Patent Application No. 201910295320.7 (with machine translation).
Du et al., "Development and Application of Pro—face Touch Screen Programmable Display Technology", Manufacturing Technology and Machine Tools, No. 4, 2009 (with English abstract).

* cited by examiner

ACTUAL POSITION

| | ABSOLUTE | | MACHINE | DISTANCE TO GO |
|---|---|---|---|---|
| X | 1532.335 | X | 2766.902 | |
| Y | -1554.398 | Y | 3878.280 | |
| Z | 2531.402 | Z | 4988.191 | |

MODAL

G13.1 F 600000 M 2
G13.1 H
G13.1 D
G13.1 T
G13.1 S

G01 G80
G97 G67 
G98 G54
G69 G64
G21 G18
G40 G69.1
G25 G40.1 G80.5
G22 G50.2 G80.4

F  0 MM/MIN
S  0 MIN

A>_

JOG ** * ***   ABSOLU RELATI ALL      11:05:35   (OPRT)
                   TE     VE (OPERATION)  (DISPLAY AFTER OPERATION)

(OPERATION)  (DISPLAY AFTER OPERATION)

(OPERATION 1)          (DISPLAY AFTER OPERATION 1)
1234.567               1231.567

(OPERATION 2)          (DISPLAY AFTER OPERATION 2)
1231.567               1231.000

(OPERATION 1)  (DISPLAY AFTER OPERATION 1)

1234.000

(OPERATION 2)  (DISPLAY AFTER OPERATION 2)

1237.000

FIG. 6D (OPERATION 1)      (DISPLAY AFTER OPERATION 1)

1234.567      1234.000

(OPERATION 2)      (DISPLAY AFTER OPERATION 2)

1234.000      1232.000

(OPERATION A)

(OPERATION B)

SHAFT FEEDER

This application is based on and claims the benefit of priority from Japanese Patent Application No. 2018-078281, filed on 16 Apr. 2018, the content of which is incorporated herein by reference.

BACKGROUND OF THE INVENTION

Field of the Invention

The present invention relates to a shaft feeder.

Related Art

Conventionally speaking, a shaft feeder is used for moving a shaft in an industrial device such as a machine tool or a robot.

With the shaft feeder, the movement amount of the shaft is set using, for example, any of the following methods: manual handle feed, manual continuous feed, incremental feed, manual handle interruption, and manual numerical command.

For manual handle feed, a manual pulse generator is used to set the movement amount of the shaft. The movement amount of the manual pulse generator can be set to a plurality of different patterns for each digit of the configuration value, and each digit is generally individually set at multiples of, for example, "×1", "×10", "×100", and "×1,000" starting from the lower digits.

Patent Document 1 discloses a mechanical control device provided with a touch panel that displays an input operation unit for manual operation. A plurality of touch switch displays are arranged in rows on the input operation unit. When the plurality of touch switch displays are continuously traced with a finger, a pulse train serving as a movement command is sent to the servomechanism of the device to be controlled.

Patent Document 1: Japanese Unexamined Patent Application, Publication No. 2000-305614

SUMMARY OF THE INVENTION

However, with the technology disclosed in Patent Document 1, the finger that continuously traces the plurality of touch switch displays on the touch panel may slip and accidentally touch an area outside of the intended touch switches. As a result, the correct movement command may not be sent to the servomechanism of the device to be controlled, which is a problem.

It is an object of the present invention to provide a shaft feeder with which an operation for setting a shaft movement amount can be performed on a touch panel and numerical values for the shaft movement amount can be accurately set.

(1) A shaft feeder (for example, a "shaft feeder 1" to be described later) according to the present invention is a shaft. feeder used for moving a shaft in an industrial device, the shaft feeder including: a display device (for example, a "display device 11" to be described later) including a touch panel; an operation detector (for example, an "operation detector 121" to be described later) that detects a left/right swipe operation on the touch panel; a display control unit (for example, a "display control unit 122" to be described later) that displays coordinate values relating to the shaft on the display device and changes the displayed coordinate values on the basis of the swipe operation detected by the operation detector; and a shaft movement unit. (for example, a "shaft movement unit 123" to be described later) that moves the shaft to a position indicated by the coordinate values on the basis of the displayed coordinate values.

(2) In the shaft feeder according to (1), when the operation detector detects a rightward swipe operation on the touch panel after one digit of the numerical value displayed as the coordinate value is touched, the display control unit may round off lower numerical values, not including a digit at which touch is detected.

(3) In the shaft feeder according to (1), when the operation detector detects a leftward swipe operation on the touch panel after an area to the right of the last digit of the numerical value displayed as the coordinate value is touched, the display control unit may round off lower numerical values, not including a digit at a position at which the leftward swipe operation ends.

(4) In the shaft feeder according to (1) to (3), when the operation detector detects a rightward swipe operation subsequent to an upwar swipe operation on the touch panel after one digit of the numerical value displayed as the coordinate value is touched, the display control unit may increment or decrement a numerical value of a digit for which touch is detected, and then round off lower numerical values, not including the digit that was touched.

(5) In the shaft feeder according to (1) to (4), when the operation detector detects a rightward swipe operation subsequent to a downward. swipe operation on the touch panel after one digit of the numerical value displayed as the coordinate value is touched, the display control unit may decrement or increment a numerical value of a digit for which touch is detected, and then round off lower numerical values, not including the digit that was touched.

(6) In the shaft feeder according to (1) to (5), when the operation detector detects an upward swipe operation subsequent to a leftward swipe operation on the touch panel after an area to the right of the last digit of the numerical value displayed as the coordinate value is touched, the display control unit may round off lower numerical values, not including a digit at which the leftward swipe operation ends, and then increment or decrement the numerical value of the digit that was swiped upward.

(7) In the shaft feeder according to (1) to (6), when the operation detector detects a downward swipe operation subsequent to a leftward swipe operation on the touch panel after an area to the right of the last digit of the numerical value displayed as the coordinate value is touched, the display control unit may round off lower numerical values, not including a digit at which the leftward swipe operation ends, and then decrement or increment the numerical value of the digit that was swiped downward.

(8) In the shaftfeeder according to (1) to (7), the coordinate value may be any one of an absolute coordinate value, a relative coordinate value or a mechanical coordinate value.

(9) in the shaft feeder according to (1) to (8), the shaft movement unit may move the shaft when the operation detector detects that the touch panel is no longer being touched.

(10) In the shaft feeder according to (1) to (8), the shaft movement unit may move the shaft when the operation detector detects that a run button displayed on the touch panel has been touched.

(11) In the shaft feeder according to (1) to (10), the display control unit may change displayed coordinate values to coordinate values that correspond to a specific reference point in a coordinate system for the industrial device when the operation detector detects, after an area to the right of the last digit of the numerical value displayed as the coordinate value is touched, a leftward swipe operation that ends outside an area to the left of the first digit of the numerical value.

(12) In the shaft feeder according to (1) to (11), the display control unit may change displayed coordinate values to coordinate values that correspond to a specific reference point in a coordinate system for the industrial device when the operation detector detects, after an area to the left of the first digit of the numerical value displayed as the coordinate value is touched, a rightward swipe operation that ends outside an area to the right of the last digit of the numerical value.

(13) A shaft feeder according to the present invention is a shaft feeder used for moving a shaft in an industrial device, the shaft feeder including: a display device including a touch panel; an operation detector that detects a left/right swipe operation on the touch panel; a display control unit that displays, on the display device, a configuration value for the industrial device including at least one of a work offset amount, an attribute value for a workpiece coordinate system, and a parameter, and changes the displayed configuration value according to the swipe operation detected by the operation detector; and a setting change unit (for example, a "setting change unit 124" to be described later) that changes settings of the industrial device on the basis of the displayed configuration value.

According to the present invention, there can be provided a shaft feeder with which an operation for setting a shaft movement amount can be performed on a touch panel and numerical values for the shaft movement amount can be accurately set.

BRIEF DESCRIPTION OF THE DRAWINGS

FIG. 2 is a diagram for illustrating an exemplary configuration screen that is displayed on a display device of the shaft feeder according to the embodiment of the present invention.

FIG. 6D is a diagram for illustrating an exemplary method for changing a configuration value displayed on the display device of the shaft feeder according to the embodiment of the present invention.

DETAILED DESCRIPTION OF THE INVENTION

An embodiment of the present invention is described below with reference to FIGS. 1 to 7.

1. CONFIGURATION OF INVENTION

Figure 1:
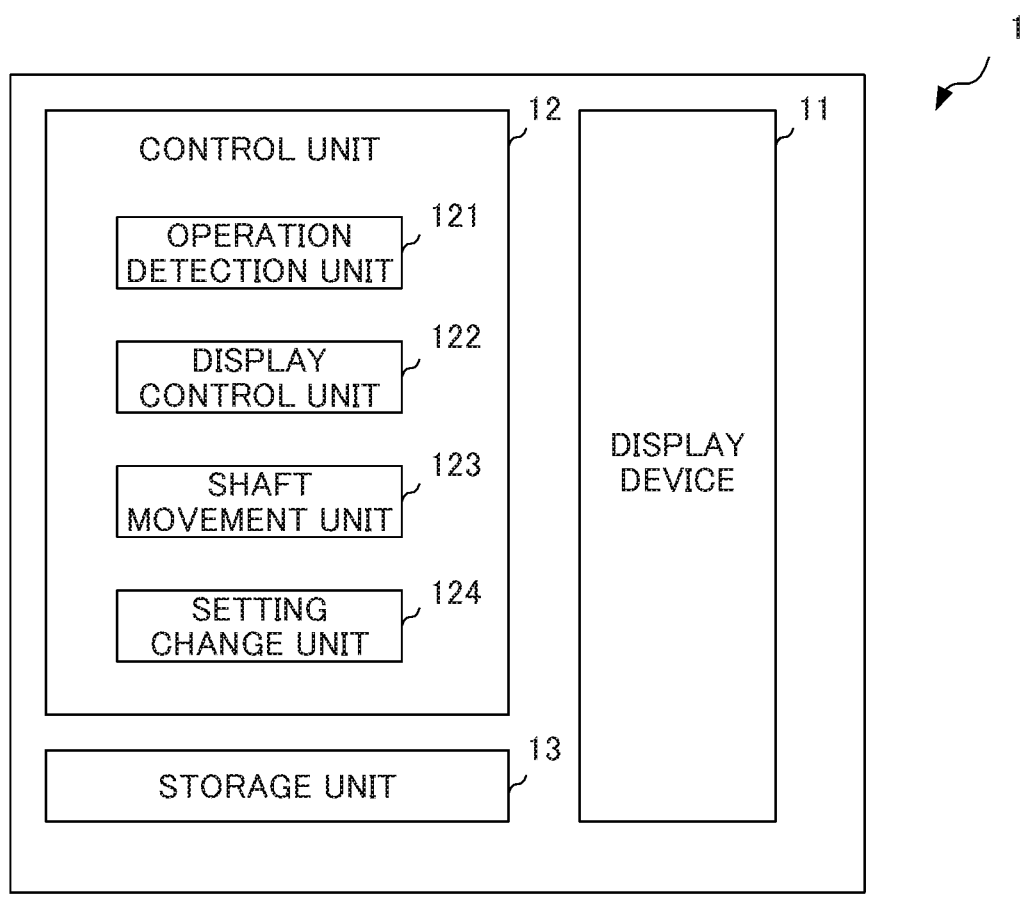
FIG. 1 is a diagram for illustrating the overall configuration of a shaft feeder according to an embodiment of the present invention.

FIG. 1 illustrates the overall configuration of a shaft feeder 1.

The shaft feeder 1 includes a display device 11, a control unit 12 and a storage unit 13.

The shaft feeder 1 is a device that is used to move a shaft in an industrial device such as an industrial robot or a machine tool.

In this embodiment, the machine tool may be a lathe, a milling machine, an electric discharge machine, a grinder, a machining center, or a laser beam machine.

The shaft feeder 1 uses a method such as manual handle feed, manual continuous feed, incremental feed or manual handle interruption to move the shaft in the industrial machine.

The display device 11 is a device that is used to display coordinate values that indicate the position of the shaft in the industrial device to be controlled by the shaft feeder 1. The coordinate values may be absolute coordinate values, relative coordinate values or mechanical coordinate values. The display device 11 may also display configuration values such as an integrated value for the movement amount in manual handle feed, manual continuous feed or manual handle interruption, or tool offset, attribute values for workpiece coordinate values, and various parameters.

The display device 11 includes a touch panel. An operator can touch the touch panel with a finger and slide (swipe) his/her finger across the touch panel to change the various coordinate values and configuration values that are displayed on the display device 11.

FIG. 2 illustrates an exemplary configuration screen that is displayed on the display device 11. Absolute coordinate values of the movement destination position for the shaft are displayed on the top left of the configuration screen. The absolute coordinate values are expressed as an X-axis coordinate value, a Y-axis coordinate value and a Z-axis coordinate value.

Mechanical coordinate values of the movement destination position are displayed to the right of the column that displays the absolute coordinate values. The mechanical coordinate values are expressed as an X-axis coordinate value, a Y-axis coordinate value and a Z-axis coordinate value.

As described later, the operator can swipe his/her finger over the numerical values displayed as the coordinate values to change the display of the coordinate values. Based on the displayed coordinate values, the shaft feeder 1 moves the shaft of the controlled device to the position indicated by the coordinate values.

Note that modal information is displayed on the bottom left of the exemplary configuration screen shown in FIG. 2.

The control unit 12 is a unit that controls the entire shaft feeder 1. The control unit 12 executes various programs by reading out, using a bus, the programs as required from a storage area such as a ROM, a RAM, a flash memory or a hard disk drive (HDD), to thereby achieve the various functions according to this embodiment.

The control unit 12 may be a CPU.

The control unit 12 includes an operation detector 121, a display control unit 122, a shaft movement unit 123, and a setting change unit 124.

The control unit 12 may also include standard function blocks in addition to the above-described components. The function blocks are function blocks that control the entire shaft feeder 1 and perform communication.

Such function blocks are well known to persons having skill in the art, and hence are omitted from the description and drawings.

The control unit 12 reads out a system program stored in a ROM using a bus to control the entire shaft feeder 1 and perform communication according to the system program.

The control unit 12 may deploy the system program stored in the ROM on the RAM in advance to read and execute the system program from the RAM.

The operation detector 121 detects operation by the operator on the touch panel in the display device 11. More specifically, the operation detector 121 uses a well-known method such as matrix switching, a resistive film method, a surface acoustic wave method, an infrared method, or an electrostatic capacitance method to detect touch movement generated by the finger of the operator on the touch panel. More importantly, the operation detector 121 detects a left-right swipe operation on the coordinate values displayed on the display device 11.

The operator may use an electronic pen instead of a finger to swipe the coordinate values displayed on the display device 11.

The display control unit 122 displays, on the display device 11, coordinate values that are used for moving the shaft in the industrial device. Examples of the coordinate values include absolute coordinate values, relative coordinate values, and mechanical coordinate values that indicate the position of the shaft in the industrial device.

The display control unit 122 also displays, on the display device 11, an integrated value for the movement amount in manual handle feed, manual continuous feed or manual handle interruption, or other configuration values such as tool offset amount, attribute values for workpiece coordinate values, and various parameters.

The display control unit 122 changes the displayed coordinate values and configuration values according to the operation detected by the operation detector 121.

Specific examples of the operation and how the displayed coordinate values and configuration values are changed according to each operation are described later.

The shaft movement unit 123 moves the shaft in the industrial device to be controlled to the position indicated by the coordinate values on the basis of the coordinate values displayed on the display device 11 by the display control unit 122.

More specifically, the shaft movement unit 123 outputs a movement command based on the coordinate values displayed on the display device 11 to the industrial device.

When the movement command is input to the industrial device, the shaft in the industrial device moves by being driven by a servomotor in accordance with the movement command.

Figure 3:
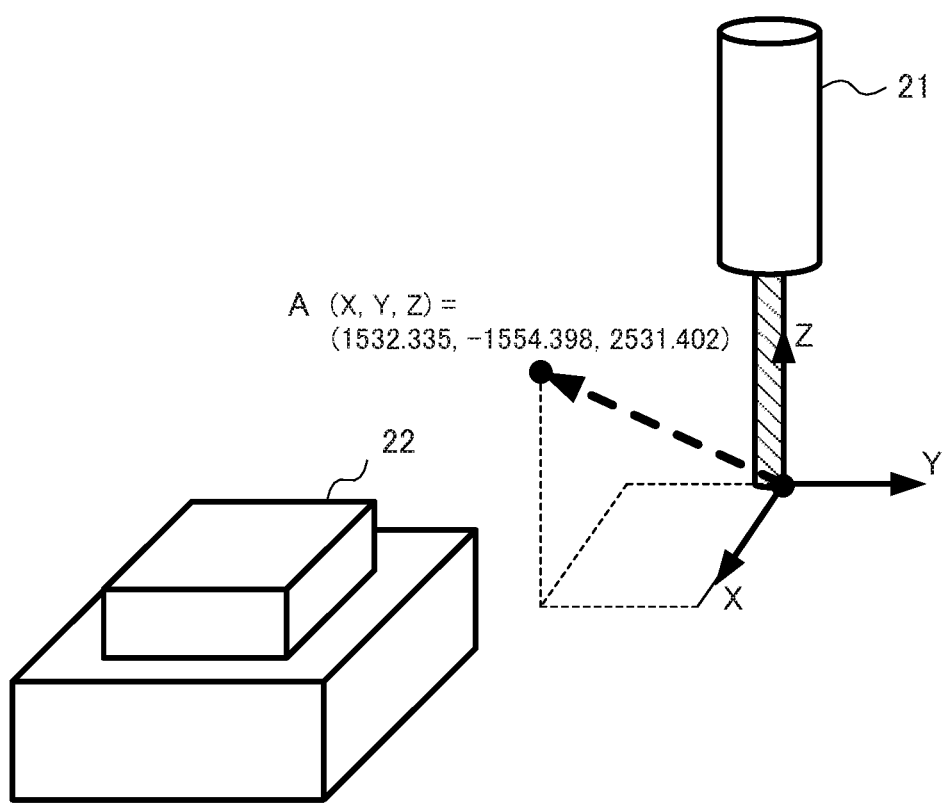
FIG. 3 is a diagram for illustrating as exemplary relationship between a workpiece and a tool that is positioned using the shaft feeder according to the embodiment of the present invention.

FIG. 3 illustrates one example of a movement position for a tool 21 on a workpiece 22 in the industrial device.

In the example depicted in. FIG. 3, orthogonal X- and Y-axes are set on a horizontal plane that includes a tip of the tool 21, and a Z-axis is set perpendicularly above the XY-plane. When the screen to be displayed on the display device 11 is, for example, the screen illustrated in FIG. 2, the shaft movement unit 123 moves the tip of the tool 21 from, for example, a current position to a point A having absolute coordinate values of $(X,Y,Z)=(1532.335, -1554.398, 2531.402)$.

As described later, when the operator changes the displayed coordinate values by swiping the coordinate values displayed on the touch panel of the display device 11, the shaft movement unit 123 moves the shaft in the industrial device to the position indicated by the changed coordinate values on the basis of the changed coordinate values. Alternatively, when the operator changes the displayed integrated value for the movement amount in manual handle feed, manual continuous feed and manual handle interruption by swiping the integrated value for the movement amount displayed on the touch panel of the display device 11, the shaft movement unit 123 moves the shaft in the industrial device on the basis of the changed integrated value for the movement amount.

As described above, a movement command is output from the shaft movement unit 123 to the industrial device when the shaft is to move. However, when the operator performs a swipe operation on the touch panel, the shaft movement unit 123 may output the movement command with the finger of the operator leaving the touch panel as a trigger.

Alternatively, a "Run" button may be displayed on the touch panel, and the shaft movement unit 123 may use the operator touching the "Run" button after changing the coordinate values with the swipe operation as a trigger to output the movement command.

Although not shown in the drawings, the setting change unit 124 changes the settings of the industrial device on the basis of configuration values such as tool offset amount, attribute value of the workpiece coordinates and various parameters.

These values are displayed on the touch panel of the display device 11 and can be changed through the operator performing a swipe operation on the touch panel.

The storage unit 13 stores the coordinate values and configuration values to be displayed on the display device 11.

2. METHODS FOR CHANGING NUMERICAL VALUES

Swipe operations on the coordinate values and configuration values displayed on the display device 11 and how the coordinate values and configuration values are changed with the swipe operations are described below with reference to FIGS. 4A to 6D.

Figure 4A:
FIG. 4A is a diagram for illustrating an exemplary method for changing a configuration value displayed on the display device of the shaft feeder according to the embodiment of the present invention.

FIG. 4A illustrates an example of changing a numerical value when an operator touches one of the digits in the numerical value displayed as a coordinate value or a configuration value and then performs an upward swipe operation on the touch panel.

The numerical value of the touched digit is incremented when the operator performs the upward swipe operation.

The degree of increment increases as the scale of the upward swipe operation increases.

Figure 4B:
FIG. 4B is a diagram for illustrating an exemplary method for changing a configuration value displayed on the display device of the shaft feeder according to the embodiment of the present invention.

FIG. 4B illustrates an example of changing a numerical value when an operator touches one of the digits in the numerical value displayed as a coordinate value or a configuration value and then performs a downward swipe operation on the touch panel.

The numerical value of the touched digit is decremented when the operator performs the downward swipe operation.

The degree of decrement increases as the scale of the downward swipe operation increases.

Figure 5A:
FIG. 5A is a diagram for illustrating as exemplary method for changing a configuration value displayed on the display device of the shaft feeder according to the embodiment of the present invention.

FIG. 5A illustrates an example of changing a numerical value when an operator touches one of the digits in the numerical value displayed as a coordinate value or a configuration value and then performs a rightward swipe operation on the touch panel.

The lower numerical values, not including the digit at which touch was detected, are rounded off in response to the rightward swipe operation by the operator.

Figure 5B:
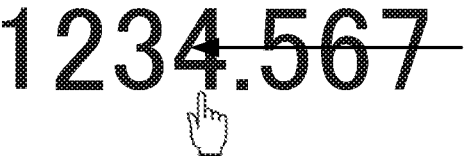
FIG. 5B is a diagram for illustrating an exemplary method for changing a configuration value displayed on the display device of the shaft feeder according to the embodiment of the present invention.

In addition, FIG. 5B illustrates an example of changing a numerical value when an operator touches an area to the right of the last digit or the numerical value displayed as a coordinate value or a configuration value and then performs a leftward swipe operation on the touch panel.

The lower numerical values, not including the digit at a position where the leftward swipe operation ends, are rounded off in response to the leftward swipe operation by the operator.

FIG. 6A to 6D illustrate examples of changing the display of coordinate values and configuration values using composite swipe operations combining the up/down swipe operation illustrated in FIGS. 4A and 4B and both the left and right swipe operations illustrated in FIGS. 5A and 5B.

Figure 6A:
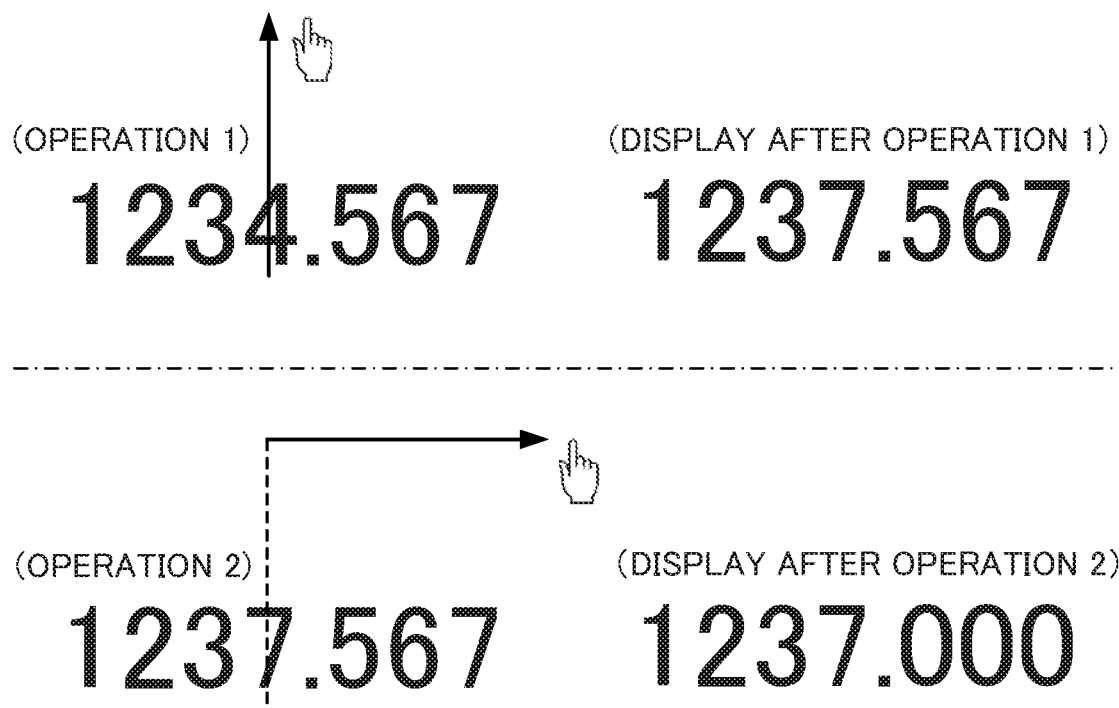
FIG. 6A is a diagram for illustrating an exemplary method for changing a configuration value displayed on the display device of the shaft feeder according to the embodiment of the present invention.

FIG. 6A illustrates an example of changing a numerical value when an operator touches one of the digits in the numerical value displayed as a coordinate value or a configuration value and then performs an upward swipe operation followed by a rightward swipe operation on the touch panel.

The numerical value of the digit that was touched is incremented in response to the upward swipe operation (operation 1) by the operator.

The degree of increment increases as the scale of the swipe operation increases.

Then, the lower numerical values, not including the digit at which touch was detected, are rounded off in response to the rightward swipe operation (operation 2) performed directly after the upward swipe operation.

For example, the lower numerical values, not including the digit at which touch was detected, can be rounded up using the operation in FIG. 6A.

Figure 6B:
FIG. 6B is a diagram for illustrating an exemplary method for changing a configuration value displayed on the display device of the shaft feeder according to the embodiment of the present invention.
Figure 6B:
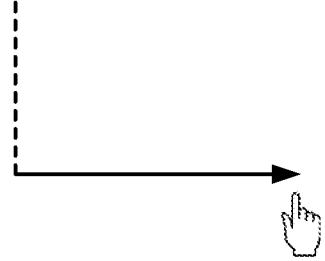

FIG. 6B illustrates an example of changing a numerical value when an operator touches one of the digits in the numerical value displayed as a coordinate value or a configuration value and then performs a downward swipe operation followed by a rightward swipe operation on the touch panel.

The numerical value of the digit that was touched is decremented in response to the downward swipe operation (operation 1) by the operator.

The degree of decrement increases as the scale of the swipe operation increases.

Then, the lower numerical values, not including the digit at which touch was detected, are rounded off in response to the rightward swipe operation (operation 2) performed directly after the downward swipe operation.

Through using the operation in FIG. 6A and the operation in FIG. 6B for different purposes, lower numerical values, not including digits for which touch is detected, can be, for example, rounded to the nearest whole numbers.

Figure 6C:
FIG. 6C is a diagram for illustrating an exemplary method for changing a configuration value displayed on the display device of the shaft feeder according to the embodiment of the present invention.
Figure 6C:

FIG. 6C illustrates an example of changing a numerical value when an operator touches an area to the right of the last digit of the numerical value displayed as a coordinate value or a configuration value and then performs a leftward swipe operation followed by an upward swipe operation on the touch panel.

The lower numerical values, not including the digit at which the leftward swipe operation ends, are rounded off in response to the leftward swipe operation (operation 1) of the operator. Then, in response to the upward swipe operation. (operation. 2) continuous with the leftward swipe operation, the numerical value of the digit at which the leftward swipe operation ends is incremented.

The degree of increment increases as the scale of the swipe operation increases.

With the operation in FIG. 6C, it is possible to round up lower numerical values, not including, for example, the digit at which the leftward swipe operation ends.

FIG. 6D illustrates an example of changing numerical values when an operator touches an area to the right of the last digit of the numerical value displayed as a coordinate value or a configuration value and then performs a leftward swipe operation followed by a downward swipe operation on the touch panel.

The lower numerical values, not including the digit at which the leftward swipe operation ends, are rounded off in response to the leftward swipe operation (operation 1) of the operator. Then, in response to the downward swipe operation (operation 2) continuous with the leftward swipe operation, the numerical value of the digit at which the leftward swipe operation ends is decremented.

The degree of decrement increases as the scale of the swipe operation increases.

Through using the operation in FIG. 6C and the operation in FIG. 6D for different purposes, lower numerical values, not including, for example, the digit at which the leftward swipe operation ends, can be rounded to the nearest whole number.

The methods for changing numerical values illustrated in FIGS. 4A to 6D may be combined as necessary.

3. EFFECTS OF EMBODIMENT

In the shaft feeder 1 according to this embodiment, the operator primarily performs left/right swipe operations on the touch panel of the display device to change the coordinate values displayed on the touch panel. The shaft in the industrial device is then moved on the basis of the changed coordinate values to the position indicated by the coordinate values.

With this configuration, the shaft movement amount can be set through an operation on the touch screen and numerical values for the shaft movement amount can be set correctly.

In addition, when changing the coordinate values displayed on the display device, the operator primarily performs a left/right swipe operation to round off the numerical values of a plurality of digits.

For example, when attempting to move the shaft in the industrial device to a convenient position using a conventional manual feed method, the multiplication of the manual handle must be repeatedly changed and the handle must be rotated multiple times in order to change the plurality of digits to "0". This requires a lot of work.

With the technology according to the present invention, coordinate values and configuration values can be easily changed with little work compared to an ordinary shaft feeder in which setting numerical values for each digit is required.

In the shaft feeder 1 according to this embodiment, the operator primarily performs left/right swipe operations on the touch panel of the display device to change the configuration values displayed on the touch panel and thereby change the settings of the industrial device on the basis of the changed configuration values.

With this configuration, the industrial device can be configured through an operation on the touch panel and various configuration values can be set accurately.

4. MODIFIED EXAMPLES

4.1. Modification Example 1

In the above-described embodiment, when one digit of the numerical value displayed as a coordinate value is touched and then a rightward swipe operation is performed on the touch panel, lower numerical values, not including the digit at which touch is detected, are rounded off.

In addition, when an area to the right of the last digit of the numerical value is touched and then a leftward swipe operation is performed, lower numerical values, not including the digit at the position at which the leftward swipe operation ends, are rounded off. However, the present invention is not limited thereto.

For example, the display control unit 122 may round off lower numerical values including the digit at which touch is detected by the operation detector 121, or lower numerical values including the digit at the position at which the leftward swipe operation ends.

In this case, the shaft feeder 1 is preferably provided with configuration means that can configure whether or not the display control unit 122 rounds off the lower numerical values, not including the digit at which touch is detected, when a rightward swipe operation is performed or, when a leftward swipe operation is performed, rounds off the lower numerical values, not including the digit at a position at which the leftward swipe operation ends, or whether or not to round off lower numerical values including such digits. In this case, the method used by the display control unit 122 to round off lower numerical values not including the digit at which touch is detected when a rightward swipe operation is performed, or lower numerical values not including the digit at the position at which the leftward swipe operation ends when the leftward swipe operation is performed is preferably set as the default method.

4.2. Modification Example 2

In the above-described embodiment, when the operator touches an area to the right of the last digit and then performs a leftward swipe operation, lower numerical values, not including the digit at a position at which the leftward swipe operation ends, are rounded off. However, the present invention is riot limited thereto.

For example, the display control unit 122 may round up or round to the nearest whole number in place of rounding down when the operator merely touches one digit in the numerical value displayed as a coordinate value and then performs a rightward swipe operation on the touch panel.

Similarly, the display control unit 122 may round up or round to the nearest whole number in place of rounding down when the operator merely touches an area to the right of the last digit of the numerical value displayed as a coordinate value and then performs a leftward swipe operation on the touch panel. In this case, the shaft feeder 1 is preferably provided with configuration means that can configure whether the display control unit 122 rounds off, rounds up or rounds to the nearest whole number when the operator performs a left/right swipe operation.

In this case, a method in which the display control unit 122 rounds off numerical values when a left/right swipe operation is performed is preferably set as the default method.

Similar to the above-described embodiments, these methods of changing numerical values may be combined as appropriate.

4.3. Modification Example 3

In the above-described embodiment, when the operator performs an upward swipe operation on the touch panel, the numerical value of the touched digit is incremented and, when the operator performs a downward swipe operation on the touch panel, the numerical value of the touched digit is decremented. However, the present invention is not limited thereto.

For example, when the operator performs an upward swipe operation on the touch panel, the numerical value of the touched digit may be decremented and, when the operator performs a downward swipe operation on the touch panel, the numerical value of the touched digit may be incremented.

In addition, in the above-described embodiment, when the operator touches one digit in the numerical value displayed as a coordinate value or a configuration value and then performs an upward swipe operation followed by a rightward swipe operation on the touch panel, the numerical value of the touched digit is incremented, and then lower numerical values not including the digit at which touch is detected are rounded off. However, the present invention is not limited thereto. For example, when the operator touches one digit in the numerical value displayed as a coordinate value or a configuration value and then performs an upward swipe operation followed by a rightward swipe operation on the touch panel, the numerical value of the touched digit may be decremented, and then lower numerical values not including the digit at which touch is detected may be rounded off.

In addition, in the above-described embodiment, when the operator touches one digit in the numerical value displayed as a coordinate value or a configuration value and then performs a downward swipe operation followed by a rightward swipe operation on the touch panel, the numerical value of the touched digit is decremented, and then lower numerical values not including the digit at which touch is detected are rounded off. However, the present invention is not limited thereto. For example, when the operator touches one digit in the numerical value displayed as a coordinate value or a configuration value and then performs a downward swipe operation followed by a rightward swipe operation on the touch panel, the numerical value of the touched digit may be incremented, and then lower numerical values not including the digit at which touch is detected may be rounded off.

In addition, in the above-described embodiment, when the operator touches an area to the right of the last digit of the numerical value displayed as a coordinate value or a configuration value and then performs a leftward swipe operation followed by an upward swipe operation on the touch panel, the numerical values of lower digits not including the digit at which the leftward swipe operation ends are rounded off, and then the digit at which the leftward swipe operation ends is incremented. However, the present invention is not limited thereto.

For example, when the operator touches an area to the right of the last digit of the numerical value displayed as a coordinate value or a configuration value and then performs a leftward swipe operation followed by an upward swipe operation on the touch panel, the numerical values of lower digits not including the digit at which the leftward swipe operation ends may be rounded off, and then the digit at which the leftward swipe operation ends may be decremented.

In addition, in the above-described embodiment, when the operator touches an area to the right of the last digit of the numerical value displayed as a coordinate value or a configuration value and then performs a leftward swipe operation followed by a downward swipe operation on the touch panel, the numerical values of lower digits not including the digit at which the leftward swipe operation ends are rounded off, and then the digit at which the leftward swipe operation ends is decremented. However, the present invention is not limited thereto.

For example, when the operator touches an area to the right of the last digit of the numerical value displayed as a coordinate value or a configuration value and then performs a leftward swipe operation followed by a downward swipe operation on the touch panel, the numerical values of lower digits not including the digit at which the leftward swipe operation ends may be rounded off, and then the digit at which the leftward swipe operation ends may be incremented.

4.4. Modification Example 4

In the above-described embodiment, when the operator touches an area to the right of the last digit of the numerical value displayed as a coordinate value or a configuration value and then performs a leftward swipe operation on the touch panel, lower numerical values not including the digit at a position at which the leftward swipe operation ends are rounded off. However, the present invention is not limited thereto.

For example, when the operator touches an area to the right of the last digit of the numerical value displayed as a coordinate value or a configuration value and then performs a leftward swipe operation on the touch panel, the numerical values displayed as a coordinate value or a configuration value may not be changed.

This is to prevent, for example, the numerical values from being changed due to an erroneous operation if the operator erroneously touches the touch screen and the finger that touched the touch screen slides to the numerical value displayed as the coordinate value or configuration value.

4.5. Modification Example 5

In the above-described embodiment, the storage unit 13 stores the coordinate values and configuration values displayed on the display device 11, but the display control unit 122 may use the coordinate values and configuration values stored in the storage unit 13 to return the coordinate values and configuration values displayed on the display device 11 to original values.

For example, if the operator changes the coordinate values and configuration values displayed on the display device 11 by performing a swipe operation on the coordinate values and configuration values and then clicks a "Cancel" button (not shown) displayed on the display device 11, the display control unit 122 may use the coordinate values and configuration values stored in the storage unit 13 to return the changed coordinate values and configuration values displayed on the display device 11 to the coordinate values and configuration values before the change.

4.6. Modification Example 6

In the above-described embodiment, the shaft movement unit 123 uses the finger of the operator leaving the touch panel or the operator touching a "Run" button when performing the swipe operation on the touch panel as a trigger to output the movement command, but a function of checking the coordinate values and configuration values displayed on the display device 11 is preferably performed before the movement command is output.

For example, the control unit 12 may include an alarm unit (not shown) and, when coordinate values displayed on the display device 11 are outside a preset movable range of the shaft, the alarm unit preferably displays an error message on the display device 11 without the shaft movement unit 123 outputting a movement command using the finger of the operator leaving the touch panel or the operator touching a "Run" button as a trigger.

In this case, the operator confirms the error message and then changes the coordinate values displayed on the display device 11 to within the movable range of the shaft. In addition, the shaft movement unit 123 again uses the finger of the operator leaving the touch panel or the operator touching a "Run" button as a trigger to output the movement command for the first time.

4.7. Modification Example 7

Alternatively, the control unit 12 preferably includes a simulation unit (not shown) that displays simulation results of shaft movement on the display device 11, with the operator touching a "Simulation" button (not shown) that is displayed on the touch panel as a trigger.

In this case, the operator confirms the simulation results and, if there are no problems, touches the "Run" button. The shaft movement unit 123 uses the operator touching the "Run" button as a trigger to output the movement instruction for the first time.

4.8. Modification Example 8

Figure 7:
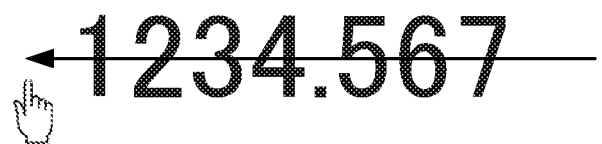
FIG. 7 is a diagram for illustrating an exemplary method for changing a configuration value displayed on the display device of the shaft feeder according to the embodiment of the present invention.
Figure 7:
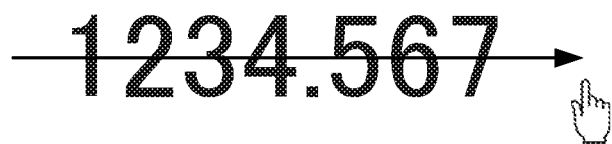

As illustrated in FIG. 7, the operator may change the coordinate values displayed on the display device 11 to coordinate values that correspond to specific reference points in a coordinate system in the industrial device when a leftward swipe operation that ends outside an area to the left of the first digit of the numerical value displayed on the display device 11 is detected (operation A) after the operator touches an area to the right of the last digit, or when a rightward swipe operation that ends outside the area to the right of the last digit is detected (operation B) after the operator touches outside the area to the left of the first digit.

An embodiment of the present invention has been described above, but the present invention is not limited to the above-described embodiment.

Further, the effects described in the embodiment are merely the most suitable effects obtained according to the present invention and are not limited to those described in the embodiment.

EXPLANATION OF REFERENCE NUMERALS 1 shaft feeder
11 display device
12 control unit
13 storage unit
121 operation detector
122 display control unit
123 shaft movement unit
124 setting change unit

What is claimed is:

1. A shaft feeder used for moving a shaft in an industrial device, the shaft feeder comprising:
a display device including a touch panel;
an operation detector that detects a left/right swipe operation on the touch panel;
a display control unit that displays coordinate values relating to the shaft on the display device and changes the displayed coordinate values on the basis of the swipe operation detected by the operation detector; and
a shaft movement unit that moves the shaft to a position indicated by the coordinate values on the basis of the displayed coordinate values,
wherein, when the operation detector detects a rightward swipe operation on the touch panel after one digit of the numerical value displayed as the coordinate value is touched, the display control unit rounds off lower numerical values, not including a digit at which touch is detected.

2. The shaft feeder according to claim 1, wherein the coordinate value is any one of an absolute coordinate value, a relative coordinate value or a mechanical coordinate value.

3. The shaft feeder according to claim 1,
wherein the shaft movement unit moves the shaft when the operation detector detects that the touch panel is no longer being touched.

4. The shaft feeder according to claim 1,
wherein the shaft movement unit moves the shaft when the operation detector detects that a run button displayed on the touch panel has been touched.

5. The shaft feeder according to claim 1,
wherein the display control unit changes displayed coordinate values to coordinate values that correspond to a specific reference point in a coordinate system for the industrial device when the operation detector detects, after an area to the right of the last digit of the numerical value displayed as the coordinate value is touched, a leftward swipe operation that ends outside an area to the left of the first digit of the numerical value.

6. The shaft feeder according to claim 1,
wherein the display control unit changes displayed coordinate values to coordinate values that correspond to a specific reference point in a coordinate system for the industrial device when the operation detector detects, after an area to the left of the first digit of the numerical value displayed as the coordinate value is touched, a rightward swipe operation that ends outside an area to the right of the last digit of the numerical value.

7. A shaft feeder used for moving a shaft in an industrial device, the shaft feeder comprising:
a display device including a touch panel;
an operation detector that detects a left/right swipe operation on the touch panel;
a display control unit that displays coordinate values relating to the shaft on the display device and changes the displayed coordinate values on the basis of the swipe operation detected by the operation detector; and
a shaft movement unit that moves the shaft to a position indicated by the coordinate values on the basis of the displayed coordinate values,
wherein, when the operation detector detects a leftward swipe operation on the touch panel after an area to the right of the last digit of the numerical value displayed as the coordinate value is touched, the display control unit rounds off lower numerical values, not including a digit at a position at which the leftward swipe operation ends.

8. A shaft feeder used for moving a shaft in an industrial device, the shaft feeder comprising:
a display device including a touch panel;
an operation detector that detects a left/right swipe operation on the touch panel;
a display control unit that displays coordinate values relating to the shaft on the display device and changes the displayed coordinate values on the basis of the swipe operation detected by the operation detector; and
a shaft movement unit that moves the shaft to a position indicated by the coordinate values on the basis of the displayed coordinate values,
wherein, when the operation detector detects a rightward swipe operation subsequent to an upward swipe operation on the touch panel after one digit of the numerical value displayed as the coordinate value is touched, the display control unit increments or decrements a numerical value of a digit for which touch is detected, and then rounds off lower numerical values, not including the digit that was touched.

9. A shaft feeder used for moving a shaft in an industrial device, the shaft feeder comprising:
a display device including a touch panel;
an operation detector that detects a left/right swipe operation on the touch panel;
a display control unit that displays coordinate values relating to the shaft on the display device and changes the displayed coordinate values on the basis of the swipe operation detected by the operation detector; and
a shaft movement unit that moves the shaft to a position indicated by the coordinate values on the basis of the displayed coordinate values,
wherein, when the operation detector detects a rightward swipe operation subsequent to a downward swipe operation on the touch panel after one digit of the numerical value displayed as the coordinate value is touched, the display control unit decrements or increments a numerical value of a digit for which touch is detected, and then rounds off lower numerical values, not including the digit that was touched.

10. A shaft feeder used for moving a shaft in an industrial device, the shaft feeder comprising:
a display device including a touch panel;
an operation detector that detects a left/right swipe operation on the touch panel;

a display control unit that displays coordinate values relating to the shaft on the display device and changes the displayed coordinate values on the basis of the swipe operation detected by the operation detector; and a shaft movement unit that moves the shaft to a position indicated by the coordinate values on the basis of the displayed coordinate values, wherein, when the operation detector detects an upward swipe operation subsequent to a leftward swipe operation on the touch panel after an area to the right of the last digit of the numerical value displayed as the coordinate value is touched, the display control unit rounds off lower numerical values, not including a digit at which the leftward swipe operation ends, and then increments or decrements the numerical value of the digit that was swiped upward.

11. A shaft feeder used for moving a shaft in an industrial device, the shaft feeder comprising:

a display device including a touch panel;

an operation detector that detects a left/right swipe operation on the touch panel;

a display control unit that displays coordinate values relating to the shaft on the display device and changes the displayed coordinate values on the basis of the swipe operation detected by the operation detector; and a shaft movement unit that moves the shaft to a position indicated by the coordinate values on the basis of the displayed coordinate values, wherein, when the operation detector detects a downward swipe operation subsequent to a leftward swipe operation on the touch panel after an area to the right of the last digit of the numerical value displayed as the coordinate value is touched, the display control unit rounds off lower numerical values, not including a digit at which the leftward swipe operation ends, and then decrements or increments the numerical value of the digit that was swiped downward.

* * * * *